United States Patent [19]

Hellsten

[11] Patent Number: 4,488,733
[45] Date of Patent: Dec. 18, 1984

[54] WHEELED PLATE CARRIER

[75] Inventor: Tord M. Hellsten, Vaxholm, Sweden

[73] Assignee: Aktiebolaget Gyproc, Malmo, Sweden

[21] Appl. No.: 527,476

[22] Filed: Aug. 29, 1983

[30] Foreign Application Priority Data

Sep. 17, 1982 [SE] Sweden .................... 8205340

[51] Int. Cl.$^3$ .................................. B62B 3/04
[52] U.S. Cl. .................... 280/47.16; 280/47.2;
280/47.34; 280/79.3; 414/453
[58] Field of Search ............. 414/10, 11, 453, 457;
280/47.13 R, 47.16, 47.2, 79.1 A, 47.31, 79.3

[56] References Cited

U.S. PATENT DOCUMENTS

| | | | |
|---|---|---|---|
| 2,201,533 | 5/1940 | Goldman | 280/47.16 |
| 2,291,474 | 7/1942 | Kalmbach | 280/47.13 R |
| 2,397,315 | 3/1946 | Harris | 280/47.13 R |
| 2,518,032 | 8/1950 | Lewis | 280/47.31 |
| 3,841,651 | 10/1974 | Bigney | 280/47.16 |
| 4,284,286 | 8/1981 | Lewallen | 280/47.2 X |

FOREIGN PATENT DOCUMENTS

| | | | |
|---|---|---|---|
| 724699 | 7/1942 | Fed. Rep. of Germany | 63 B/3 |
| 2002301 | 2/1979 | United Kingdom | 280/47.16 |

OTHER PUBLICATIONS

1982 Gyproc Handbook of Lattbyggnadsteknik, Jun. 1982, p. 32.

Primary Examiner—Robert J. Spar
Assistant Examiner—Ken Muncy
Attorney, Agent, or Firm—Fred Philpitt

[57] ABSTRACT

A hand-operated, wheeled carrier for transporting large-sized plates, such as building boards, comprises a stand including a generally upright frame structure mounted on an elongate base structure having along one longitudinal side thereof brackets, on which a small number of plates to be carried may be rested on edge in a position leaning against the frame structure, a hook member and strap connected to the stand being provided to releasably retain the plates in such position. Substantially midway between its ends and close to the plate brackets the base structure has a single, relatively large supporting wheel adapted to take the entire load, when the stand is to be moved, the stand then being balanced on the single wheel by the operator. A pair of casters, one near each end of the base structure, provide additional supports for keeping the stand in a stable position when at rest, the casters being located further away from the plate brackets than the supporting wheel. The frame structure of the stand includes a substantially horizontal and easily accessible handle bar of considerable length.

12 Claims, 5 Drawing Figures

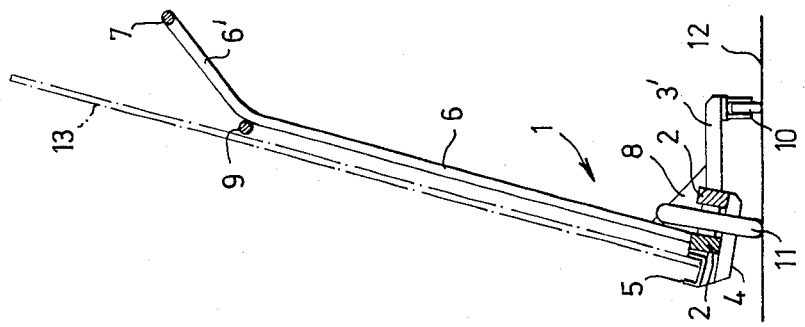
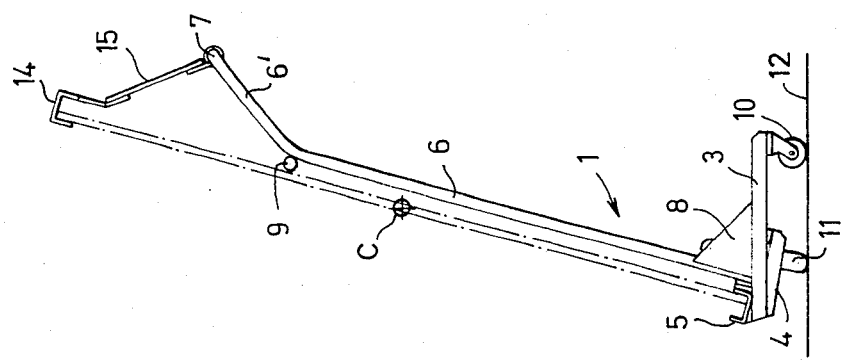
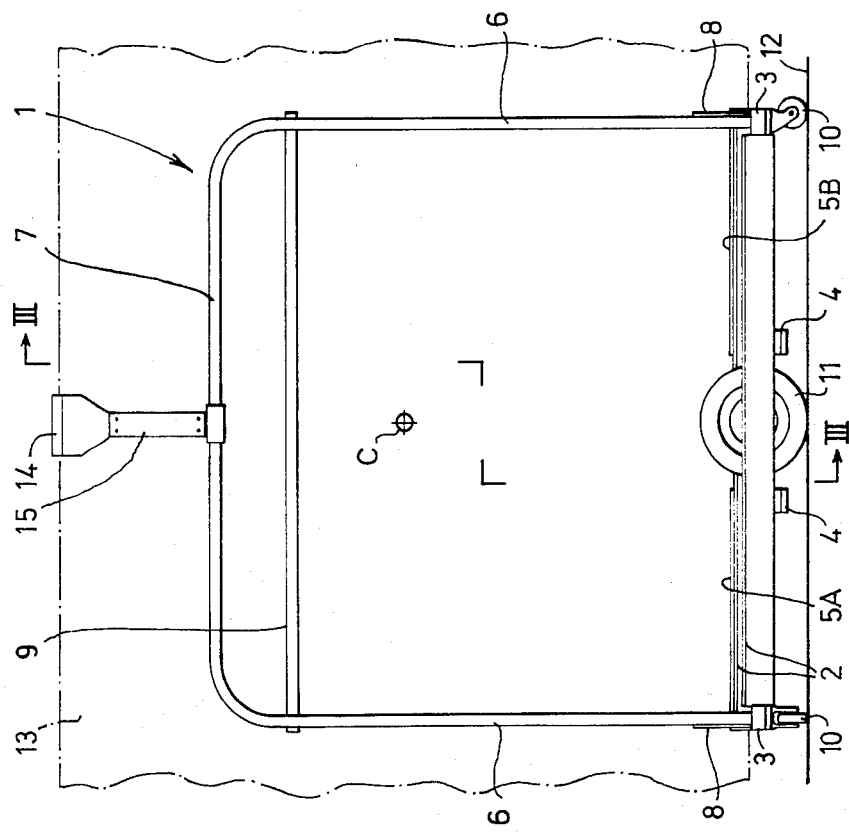

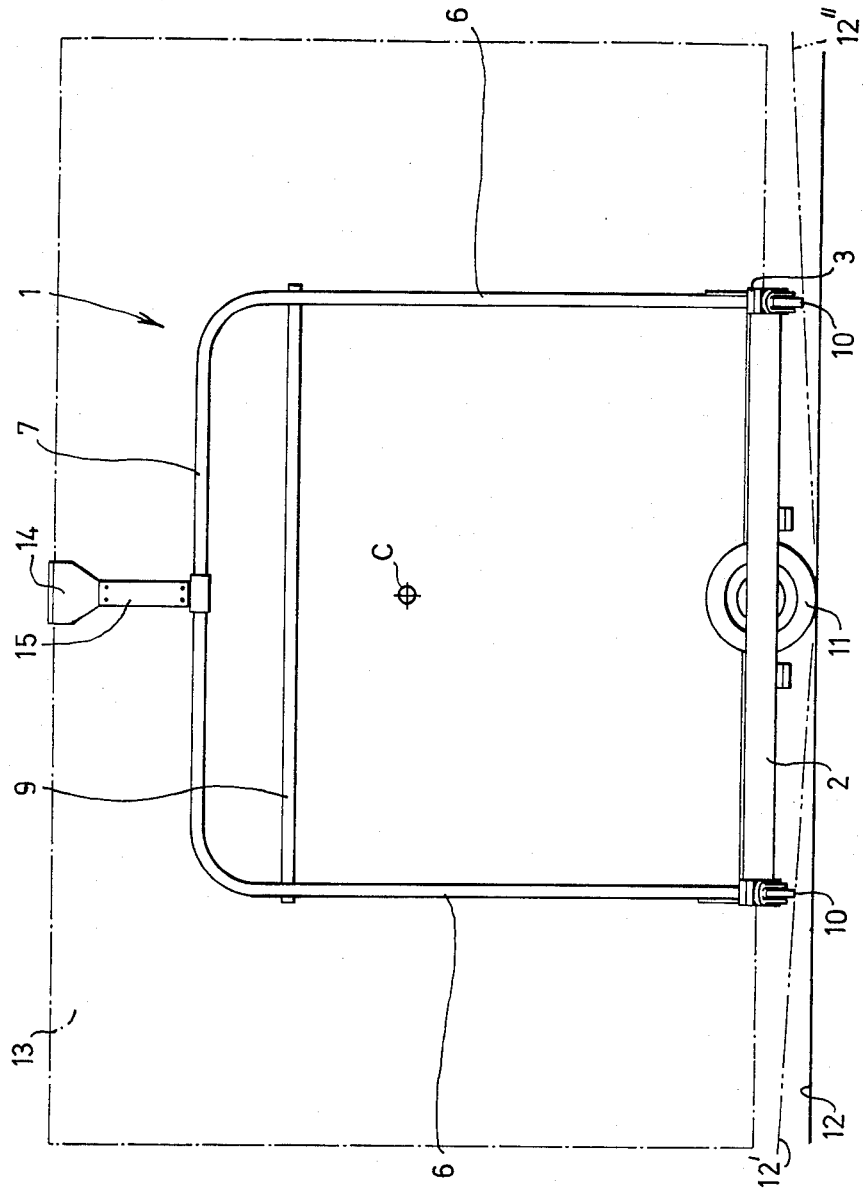

WHEELED PLATE CARRIER

BACKGROUND OF THE INVENTION

1. Field of the Invention

The invention relates to a hand-operated, wheeled carrier for transporting large-sized plates, commonly of rectangular shape, individually or in small bundles to places which cannot conveniently be reached by trucks, cranes or other kinds of motor-driven load handling facilities. Typically, a wheeled plate carrier of this kind is used for moving large-sized building boards from a supply delivered by a truck or crane to places within a building where they are to be installed or worked.

2. Description of the Prior Art

A great variety of hand-operated, wheeled vehicles have been suggested in the past for moving objects, which are difficult for a single man to carry not only because of their weight but also because of their unwieldiness. Certain vehicles of this kind are especially adapted to carry large-sized plates of various materials and comprise a stand, on which the plates may be placed in nearly erect positions with their lower edges resting on some kind of brackets and be prevented from falling by being leaned against an upper portion of the stand. Frequently these stands are elongate and adapted to receive the plates on one longitudinal side only. In known forms of such plate carriers the stand is commonly provided with two fixed wheels in permanent contact with the floor or ground and with at least one additional support, whereby it may occupy a fully stable position of rest on a substantially level surface. The additional support may be a foot, which can be lifted in some manner when the stand is to be moved, or a caster, which permits steering of the plate carrier also if remaining in contact with the floor when the stand is moved.

Common to all prior plate carriers of the kind just mentioned is that, in spite of the fact that the plates are carried in an almost upright position, they have a considerable width and always run on at least two wheels when being moved. This makes it difficult to maneuver them in confined spaces and on uneven surfaces.

SUMMARY OF THE INVENTION

The main object of the present invention is to provide an improved plate carrier of the kind referred to which is extremely easy to maneuver in confined places, can be readily walked even through narrow passages, and can easily pass over thresholds, pits and other small obstructions in its way. This is mainly achieved by designing it such that it can be conveniently swung up to an erect position in which to move on only one single supporting wheel located approximately straight under the center of gravity of the unit whether the stand is loaded or not.

Other objects and advantages of the invention will appear from the following text and the novel features will be particularly pointed out in the appended claims.

BRIEF DESCRIPTION OF THE DRAWINGS

For elucidation of the invention a preferred embodiment thereof will now be described more in detail with reference to the accompanying drawings, in which FIG. 1 is a side view of the plate carrier in its position of rest, FIG. 2 is an end view of the same as seen from the left in FIG. 1, FIG. 3 is a cross sectional view taken on line III—III of FIG. 1, FIG. 4 is an end view similar to that of FIG. 2 but showing the plate carrier in its transporting position, and FIG. 5 is a side view similar to that of FIG. 1 but again showing the plate carrier in its transporting position.

DESCRIPTION OF THE PREFERRED EMBODIMENT

The hand-operated, wheeled plate carrier shown in the drawings is intended to facilitate the transport of generally rectangular plates of considerable size, such as boards or panels to be used in erecting, reconditioning or repairing buildings and commonly having a width of about 120 centimeters and a length of about 200–365 centimeters. It comprises an elongate stand generally designated by the numeral 1 and including a lower portion or base structure formed by a pair of longitudunally extending, parallel beams 2 having their respective ends interconnected by crossbars 3. The two beams 2 lie in a plane which in the position of rest of the stand 1 is inclined and forms a small angle, approximately 10°, with the floor 12 on which the stand is rested, whereas the two crossbars 3 in the very same position of the stand 1 are generally parallel to the floor and project on both sides of the beams 2. Closer to the middle of their lengths the two beams 2 are further interconnected by two crosspieces 4 projecting on one side of the two beams only. One end portion of each crossbar 3 forms a bracket on which an outer end of a channel bar member 5A, and 5B respectively, is secured, whereas the projecting end portion of each crosspiece 4 forms a bracket on which an inner end of the respective channel bar members is secured. The two channel bar members 5A and 5B are longitudinally spaced, as can be seen in FIG. 1, but are aligned and form together a plate support 5 extending along one longitudinal lateral side of the base structure of the stand 1.

The upper portion or frame structure of the stand 1 is formed by an inverted U-member suitably made of a tube of circular cross section and having a pair of downwardly directed legs 6, the upper ends of which are interconnected by a horizontally extending handle bar 7. Each of the two legs 6 has its lower end rigidly secured to a related one of the two crossbars 3 inside of the channel bar member 5A, or 5B respectively, the connection being braced by a triangular piece 8 of sheet metal. From their respective crossbars 3 the two legs 6 extend upwardly in a plane that is parallel to the longitudinal direction of the stand but forms an acute angle of about 70°–75° to the plane of the crossbars 3. Well above the crossbars 3 a horizontally extending, tubular prop rail 9 is secured to the legs 6 on the sided thereof turned towards the plate support 5. Approximately on a level with the rail 9 the legs 6 are bent laterally out of the beforementioned plane and away from said rail in order to locate the handle bar 7 laterally offset in relation to the rail 9 and only slightly above the same as illustrated in FIGS. 2 and 3.

In its position of rest the stand 1 is supported on one hand by two casters 10, which are widely spaced in the longitudinal direction of the stand 1, and on the other hand by one single additional supporting wheel 11 having a considerably larger diameter than the caster wheels and being located at least approximately midway between the two casters 10 counted in the longitudinal direction of the stand. Each caster 10 is attached under its own crossbar 3 and, more specifically, under the end portion 3' thereof which is remote from the plate support 5, and the lateral distances between the two casters 10 and the plate support 5 are substantially equal and preferably about one fourth of the distance between the two casters. The supporting wheel 11 is in its turn mounted between the two beams 2 and in the space between the two crosspieces 4 whereby it will be located much closer to the plate support 5 than the two casters 10. Its axis of rotation extends transversely to the beams 2 and is parallel to the common plane of the latter, which means that it is slightly inclined, forming an angle with the floor of about 10°. Thus the plane of the supporting wheel 11 leans in the same direction as the legs 6 but only about half as much.

As a result, the stand 1 in its position of rest will be supported at three points representing the corners of an isosceles triangle having an obtuse apex.

The plate 13 to be transported by means of the wheeled carrier, which plate in the various figures is shown by dash-and-dot lines, is placed on the stand 1 in a substantially upright position with its lower edge, commonly a longitudinal edge, rested in the channel-like plate support 5 and is leaned against the prop rail 9. If desired, a few plates 13, say up to five, may be loaded onto the stand 1 in face to face relationship. In loaded position the plate 13, or the bundle of parallel plates, is retained by a releasable hook member 14 hooked over the upper plate edge or edges. In the example shown the hook member 14 is connected to the handle bar 7 of the stand 1 by means of an elastically extensible rubber strap 15, but any other connection permitting convenient removal of the hook member 14 from the upper plate edge or edges may be used. Also it should be readily understood that two or even more hook members may be used instead of the single one shown.

It is presupposed that each plate 13, when being loaded on the stand 1, shall be given such a position that its center of gravity C will be located approximately straight above the supporting wheel 11 counted in the longitudinal direction of the stand (FIGS. 1 and 5), and that the size and general design of the stand are adapted in such manner to the plate load to be carried that, in the position of rest of the stand 1, the center of gravity of the load will always be located vertically above an imaginary point on the floor 12 situated within the triangle defined by the two casters 10 and the supporting wheel 11 as previously described. Thereby the position of rest of the wheeled plate carrier will be stable irrespective of whether the stand is loaded or not.

When the stand 1, with or without a load, is to be moved, it may, of course, simply be rolled in its longitudinal direction on both its supporting wheel 11 and its two casters 10 while standing in its position of rest, the casters then making it possible to steer the unit. However, moving the stand in this manner is possible only when the floor or supporting surface is substantially free of all irregularities which might cause the unit to overturn or obstruct the passage of the relatively small caster wheels. If this is not the case, moving the unit will still be possible in a convenient manner by swinging up the stand into an erect transporting position illustrated in FIGS. 4 and 5, in which the entire unit is supported solely by the large supporting wheel 11. Erecting the stand, even if the same is fully loaded, is an easy task for an operator standing on that side thereof which is opposite to the plate load. He simply grasps the handle bar 7 and presses it a short distance away from himself, whereupon he, walking at the side of the unit, with only moderate effort will be able to move the same considerable distances over obstacled surfaces as well as through intricate passages while keeping it balanced on the single supporting wheel 11.

Practical tests have shown that moving the plate carrier on the large supporting wheel 11 only is much facilitated by giving the handle bar 7 a considerable length and by making it easily accessible for grasping as is the case in the embodiment of the invention illustrated in the drawings. Also, the ability of the plate carrier to easily pass over floor or ground obstructions highly depends on the size of the supporting wheel 11. On the other hand, an extremely large wheel diameter requires a more complex design of the stand, and in practice it has been found most adequate to choose a supporting wheel the diameter of which is roughly of the same order as the lateral distance between the wheel 11 and an imaginary line drawn between the two casters 10.

As will be readily understood, the casters 10 are in no way needed to make the stand 1 movable for transporting the plates from place to place. Accordingly, they may be replaced by simple feet, runners or the like, if so desired, whereby the stand when being in its position of rest will be prevented from moving by itself, should the floor not be completely level. On the other hand, the casters 10, or their substitutes, should be arranged in such manner that, when the plate carrier is erected into its transporting position (FIGS. 4 and 5), they still reach down to a level substantially below the lower edge or edges of the plate or plates supported on the stand 1. By doing so they will assist in preventing the operator from tilting the stand too much forward or backward in the direction of movement. Provided that the distance between the two casters 10 is sufficiently great in comparison with the horizontal length of the plate 13, the casters will then also assist in preventing the lower corners of the plate from hitting the floor and possibly become damaged. In FIG. 5 this effect has been illustrated by the two inclined dash-and-dot lines 12' and 12'' extending from the point where the supporting wheel 11 contacts the floor 12.

In practice, when the wheeled carrier shown and described is to be used within a building or a building site for transporting building boards, such as plaster boards or chip boards, of standard sizes of the order previously mentioned, it is preferred to place the handle bar 7 approximately 100–110 centimeters above the floor 12 and to give it a horizontal length of at least 80 centimeters. The plate support 5 may be about 10 centimeters above the floor. The length of the stand 1 and, hence, the distance between the two casters 10 may be about 100–125 centimeters, whereas the lateral distance between the supporting wheel 11 and an imaginary line between the two casters 10 should be at most one fourth of the length of the stand. The supporting wheel 11 should be mounted as close to the plate support 5 as its reliable attachment to the base structure of the stand 1 permits. In the position of rest of the stand the inclination of the plate 13 from the vertical plane should not exceed about 25° and may preferably be between 10° and 20°, and the inclination of the supporting wheel 11 from the vertical plane should be at most 15° and preferably be about half the inclination of the loaded plates.

A general aim in designing the wheeled plate carrier must always be to make a stand structure which is rigid and strong but still has a minimum weight. With this in mind it should be understood that various changes in the details, materials, and arrangements of parts, which have been herein illustrated and described in order to explain the nature of the invention, may be made by those skilled in the art without deviating from the principle and scope of the invention as expressed in the appended claims.

As well known, plates or boards to be used on a building site are frequently stored lying on top of one another in a pile resting on some kind of pallet or bed. From such a pile the plates may advantageously be loaded on the stand of a plate carrier herein described in the following manner: First the plates to be picked up and lying on top of the pile are slightly displaced in relation to the underlying ones in order to make one longitudinal margin of them free, whereupon the stand is tilted to a position lying on top of the pile with the prop rail 9 in a contact with the top surface of the uppermost plate. Thereafter the stand is pushed inwardly over the pile in such a manner that the projecting margins of the displaced plates are received in the channel-like plate support 5, whereupon the hook member 14 is hooked fast over the opposite longitudinal margins of said plates in order to lock them to the stand. When this has been accomplished, the stand 1 and the plates connected thereto may be pulled back and tilted up into its erect position, and the transport may commence immediately. Of course, this manner of loading can only be used when the plate is sufficiently rigid not to be deformed when tilted back to its erect position.

In order to facilitate the loading of plates on the stand also when the same is in its position of rest, as well as the removal of the loaded plates from the stand when the destination of the transported plates has been reached and the stand is again tilted back to its position of rest, the inner ends of the plate supporting channel bar members 5A and 5B are arranged in a manner to leave the lower margins of the loaded plates free for grasping within a region adjacent and laterally in front of the large supporting wheel 11, as shown in FIG. 1.

I claim:

1. A hand-operated, wheeled plate carrier for transporting a small number of large-sized, generally rectangular plates at a time and comprising
   (a) a stand having an elongate base structure;
   (b) bracket means provided on said base structure along one longitudinal side thereof only to form a support, on which the plates to be transported may be rested on edge in a nearly upright position;
   (c) an upper frame structure secured to and extending upwardly from said base structure inside said bracket means thereon in a manner to form a lateral support, against which the plates to be transported may be leaned, said upper frame structure extending mainly in the longitudinal direction of said base structure;
   (d) means connected to said upper frame structure for releasably retaining the plates to be transported in their nearly upright position, in which they are seated on said bracket means and leaned against said upper frame structure;
   (e) a handle element forming part of said upper frame structure and arranged in a manner to be conveniently grasped by an operator along at least a considerable part of the length of said base structure from one side of said stand also when plates are loaded on said stand;
   (f) a single main supporting wheel of considerable diameter mounted on said elongate base structure in a position at least approximately midway between the ends thereof and close to and inside said plate supporting bracket means thereon in a manner to rotate about a fixed axis extending in the transverse direction of said base structure; and
   (g) two additional supporting members mounted on said elongate base structure near the respective, opposite ends thereof, said two supporting members being substantially equally spaced from said plate supporting bracket means and located on the same side thereof as is said main supporting wheel but further away from said bracket means than said wheel,
   whereby said stand, whether loaded or not, on a substantially horizontal surface may be placed in a stable position of rest, in which it is supported by said main supporting wheel as well as by said two additional supporting members, and from which an operator grasping said handle element may swing it up into an erect transporting position in which it is supported by said single main supporting wheel only.

2. A hand-operated, wheeled plate carrier according to claim 1, wherein said stand when being in its position of rest is adapted to hold the plates to be transported in a position, in which the planes thereof form an angle with the vertical of at most 25°.

3. A hand-operated, wheeled plate carrier according to claim 2, wherein said stand is adapted to hold the plates in a position, in which the planes thereof form an angle with the vertical of between 10° and 20°.

4. A hand-operated, wheeled plate carrier according to claim 2, wherein said plate supporting bracket means on said base structure are hook-shaped in cross section to receive and retain the lower margins of the loaded plates, and wherein said means for releasably retaining the plates on the stand comprise at least one hook member adapted to be hooked over the upper margins of the loaded plates.

5. A hand-operated, wheeled plate carrier according to claim 4, wherein said plate supporting bracket means are arranged on said base structure in a manner to leave the lower edges of the loaded plates free for grasping within a region adjacent said main supporting wheel.

6. A hand-operated, wheeled plate carrier according to claim 1, wherein said handle element is a generally horizontal bar extending in the longitudinal direction of said base structure at a height above the same which approximately equals the length of said base structure.

7. A hand-operated, wheeled plate carrier according to claim 6, wherein said horizontal handle bar extends along approximately the full length of said base structure.

8. A hand-operated, wheeled plate carrier according to claim 1, wherein the axis of rotation of said main supporting wheel is inclined in a manner to cause said wheel to rotate in a plane which, when said stand is in its position of rest, leans in the same direction as the plates loaded on the stand and forms an angle with the vertical of at most about 15°.

9. A hand-operated, wheeled plate carrier according to claim 8, wherein the diameter of said main supporting wheel approximately equals the lateral distance between said wheel and an imaginary straight line connecting said two additional supporting members.

10. A hand-operated, wheeled plate carrier according to claim 1, wherein the longitudinal distance between said two additional supporting members is at least four times the lateral distance between said main supporting wheel and an imaginary straight line connecting said two additional supporting members.

11. A hand-operated, wheeled plate carrier according to claim 10, wherein each of said two additional supporting members is attached under the end portion of an arm extending laterally from said base structure.

12. A hand-operated, wheeled plate carrier according to claim 1, wherein said two additional supporting members are casters.

* * * * *